United States Patent [19]

Maeda

[11] Patent Number: 4,897,094
[45] Date of Patent: Jan. 30, 1990

[54] IN-LINE FILTER ASSEMBLY FOR COMPRESSED AIR

[75] Inventor: Sadao Maeda, Okazaki, Japan

[73] Assignee: Maeda Shell Service Co., Ltd. and J&M Co., Ltd., Aichi, Japan

[21] Appl. No.: 330,907

[22] Filed: Mar. 31, 1989

[30] Foreign Application Priority Data

Apr. 5, 1988 [JP] Japan .............................. 63-46072[U]
May 13, 1988 [JP] Japan .............................. 63-63478[U]

[51] Int. Cl.$^4$ ............................................. B01D 46/00
[52] U.S. Cl. ....................................... 55/219; 55/323; 55/424; 55/431
[58] Field of Search ................. 55/218, 219, 322, 323, 55/423–426, 431

[56] References Cited

U.S. PATENT DOCUMENTS

| | | | |
|---|---|---|---|
| 1,896,833 | 2/1933 | Bramsen et al. | 55/322 |
| 2,521,785 | 9/1950 | Goodloe | 55/482 |
| 3,464,186 | 9/1969 | Hankison et al. | 55/163 |
| 3,791,105 | 2/1974 | Rhodes | 55/97 |
| 3,923,480 | 12/1975 | Visch | 55/257 |
| 4,015,959 | 4/1977 | Grote | 55/274 |
| 4,116,650 | 9/1978 | Lane | 55/387 |
| 4,400,187 | 8/1983 | Lane | 55/387 |
| 4,487,618 | 12/1984 | Mann | 55/323 |
| 4,600,416 | 7/1986 | Mann | 55/323 |

FOREIGN PATENT DOCUMENTS

| | | | |
|---|---|---|---|
| 0101555 | 2/1984 | European Pat. Off. | |
| 628501 | 10/1927 | France | 55/319 |
| 45-36182 | 11/1970 | Japan | |
| 1499929 | 2/1978 | United Kingdom | |

Primary Examiner—Bernard Nozick
Attorney, Agent, or Firm—Oliff & Berridge

[57] ABSTRACT

A filter device including an intermediate sleeve, an upper and a lower cap closing the upper and lower ends of the sleeve and cooperating with the sleeve to define an upper and a lower volume on opposite sides of an inner partition wall, and an inner tube disposed in the lower volume so as to extend from the partition wall and cooperating with the lower cap to define an inner space and an outer space which communicate with each other through a bottom space formed below the inner tube. The lower volume communicates with the upper volume through the inner space. The sleeve has an inlet port communicating with the outer space and receiving an incoming compressed air, and an outlet port communicating with the upper volume for discharging the air. The outer space is filled with a first packing. A porous structure is accommodated within the bottom space, for trapping droplets from the compressed air flowing through the first packing. A draining device is provided for discharging a mass of the droplets out of the bottom space. A second packing is disposed in the upper volume, for vaporazing liquid particles remaining in the air which has passed the first packing.

8 Claims, 7 Drawing Sheets

IN-LINE FILTER ASSEMBLY FOR COMPRESSED AIR

BACKGROUND OF THE INVENTION

1. Field of the Invention

The present invention relates in general to an in-line filter device connected to a compressed air line, and more particularly to such an in-line compressed air filter device having an improved structural arrangement, which permits efficient removal of liquid particles such as water and oil vapor contained in compressed air and which is compact in construction and allows easy maintenance service thereof.

2. Discussion of the Prior Art

Conduits used for supplying compressed air to various pneumatically operated components employed in various factories, atomic plants and medical equipment, for example, are generally provided with an in-line filter device or assembly for removing water and oil vapor contained in the flowing compressed air, for the purpose of protecting the pneumatic components Various types of such in-line filter devices have been conventionally available. For instance, U.S. Pat. No. 4,487,618 to David O. Mann discloses an in-line filter device called "airline vapor trap", which is capable of removing water and/or oil vapor from a compressed air line, with particularly high efficiency.

Described more specifically, the airline vapor trap disclosed in the above-identified publication includes a first filter having a first pad or packing of wire mesh fibers such as stainless steel fibers, a second filter having a second pad or packing of an absorbent plug structure comprising cottom fibric, for example, and a hollow base which defines an enclosed volume or chamber which communicates with the first and second filters and which is provided with a drain opening. Vapor or liquid particles contained in incoming compressed air are coalesced into droplets while the compressed air is passed through the first filter, and the droplets are trapped within the enclosed chamber of the hollow base. The trapped droplets are discharged through the drain opening. Thus, the vapor or liquid particles are separated from the compressed air. As the compressed air stream thus dried is passed through the second filter, any remaining vapor is vaporized. In this manner, the water and oil vapor, and dust or other foreign matters are effectively removed by the in-line vapor trap or filter device.

For preventing condensation (liquefaction) of a small volume of remaining vapor which has been vaporized, it is desirable to position the in-line filter device at a location along the compressed air conduit, which is relatively near a pneumatic component connected to the conduit. However, the in-line filter device of the type described above tends to be comparatively large-sized, due to a laterally spaced-apart arrangement of the first and second filters in the form of two independent cartridges apart from each other in the direction of length of the airline conduit. Accordingly, the filter device requires a relatively large space for installation. Therefore, there exists a limitation in the location of the filter device that can be selected along the length of the conduit. In other words, it is desirable to construct an in-line filter device as compact as possible. In this respect, there remains some room for improvement in the construction of the in-line filter device of the type disclosed in the above-identified publication.

In the filter device in question, the pads or packings in the first and second filters should be cleaned or replaced with new ones, as the packings are contaminated. In particular, the packing in the second filter should preferably be replaced at a shorter time interval than that in the first packing. However, the laterally spaced-apart first and second filters of the filter assembly shown in the above-identified document are mounted and clamped with a plurality of bolts between an upper cap in the form of a manifold, and a lower cap in the form of the hollow base. When the bolts are removed for removing one of the first and second filter cartridges, the entire assembly is disassembled. Namely, it is difficult to remove only one of the two filter cartridges. Thus, the maintenance service of the filter assembly is comparatively cumbersome.

Further, the droplets separated from the compressed air should be efficiently discharged from the filter device, without lowering the pressure of the compressed air. For this purpose, a drain valve as disclosed in laid-open Publication No. 45-36182 of examined Japanese Patent Application or other suitable draining means is suitably used. The drain valve disclosed in the above publication is automatically placed in its open position for discharging only the liquid consisting of a mass of the trapped droplets, when the volume of the liquid exceeds a predetermined value.

However, the liquid always stays in a given amount in the bottom portion of the housing of the filter device, and tends to be re-vaporized before the liquid is discharged. This means low efficiency of removal of the liquid particles from the compressed air.

SUMMARY OF THE INVENTION

The present invention was developed in view of the above situations in the prior art. It is accordingly a first object of the present invention to provide an improved in-line filter device which is capable of highly efficiently removing liquid particles such as water and oil vapor contained in compressed air flowing through a conduit, and which is compact or simple in construction and permits independent removal of its two filters for easy maintenance thereof.

A second object of the invention is to provide such an in-line filter device wherein the re-evporization of the trapped droplets or liquid particles is effectively prevented, to permit improved efficiency of removal of the liquid particles.

The above first object may be accomplished according to the principle of the present invention, which provides an in-line filter device including first filter means having a first packing adapted to coalesce vapor or liquid particles contained in compressed air passing therethrough, into droplets, trapping means for trapping the droplets and thereby separating the droplets from the compressed air, and second filter means having a second packing through which the compressed air which has passed the first filter means flows, the second packing being adapted to vaporize residual liquid particles remaining in the compressed air which has passed the first filter means, the in-line filter device comprising: (a) an intermediate sleeve having an upper and a lower open end and an inner partition wall structure; (b) an upper cap closing the upper open end of the intermediate sleeve and cooperating with the intermediate sleeve to define an upper volume on one of the opposite sides of the partition wall structure; (c) a lower cap closing the lower open end of the intermediate sleeve and cooperating with the intermediate sleeve to define a lower volume on the other side of the partition wall structure, the intermediate sleeve and the upper and lower caps constituting a housing assembly having the upper and lower volumes separated from each other by the partition wall structure; (d) an inner tube disposed in the lower volume so as to extend from the partition wall structure, and cooperating with the lower cap to define an inner space and an outer annular space which communicate with each other through a bottom space formed below the inner tube, the lower volume communicating with the upper volume through the inner space, the intermediate sleeve having an inlet port which communicates with the outer annular space and which receives an incoming compressed air, and an outlet port which communicates with the upper volume and through which the compressed air is discharged from the housing assembly, the outer annular space being filled with the first packing, to form the first filter means; (e) a porous structure accommodated within the bottom space, as the trapping means for trapping the droplets formed during passage of the compressed air through the first filter means; and (e) draining means for discharging a mass of the droplets trapped by the porous structure, out of the housing assembly. The second packing fills at least a portion of the upper volume and thereby forming the second filter means through which the compressed air which has passed through the inner space flows.

In the filter device of the present invention constructed as described above, the first means and the second filter means are disposed in the lower and upper volumes formed on the opposite sides of the partition wall structure of the intermediate sleeve. Therefore, the filter device may be made compact and small-sized as a whole, while at the same time the first and second filter means may have sufficiently large cross sectional areas of flows of the compressed air therethrough. Namely, the instant filter device is a compact filter assembly capable of efficient removal of liquid particles from the compressed air.

Further, the first and second packings of the first and second filter means may be readily removed for replacement or cleaning, independently of each other, by simply removing the appropriate lower and/or upper caps from the intermediate sleeve. This maintenance operation may be readily and efficiently achieved without disconnecting the filter device from a relevant compressed air line.

In one form of the present invention, one of the intermediate sleeve and the lower cap has a plurality of radially outwardly extending first engagement portions formed near the open end thereof such that the first engagement portions are spaced apart from each other in a circumferential direction of the housing assembly. The other of the intermediate sleeve and the lower cap has a plurality of radially inwardly extending second engagement portions formed near the open end thereof such that the second engagement portions are spaced apart from each other in the circumferential direction. When the intermediate sleeve and the lower cap are assembled, the open end portion of the above-indicated one of the intermediate sleeve and the lower cap is fitted in the open end portion of the other of the intermediate sleeve and the lower cap. Then, the first and second engagement portions are brought into engagement with each other by rotating the intermediate sleeve and the lower cap relative to each other by a suitable amount.

In another form of the invention, one of the intermediate sleeve and the upper cap has a plurality of radially outwardly extending first engagement portions formed near the open end thereof such that the first engagement portions are spaced apart from each other in a circumferential direction of the housing assembly. The other of the intermediate sleeve and the upper cap has a plurality of radially inwardly extending second engagement portions formed near the open end thereof such that the second engagement portions are spaced apart from each other in the circumferential direction. When the intermediate sleeve and the upper cap are assembled, the open end portion of the one of the intermediate sleeve and the upper cap is fitted in the open end portion of the other of the intermediate sleeve and the upper cap. Then, the first and second engagement portions are brought into engagement with each other, by rotatiang the intermediate sleeve and the upper cap relative to each other by a suitable amount.

The lower cap may preferably have a larger depth than the upper cap, for providing the bottom space without reducing the inner and outer spaces in the lower volume.

In a further form of the invention, the filter device further comprises a second inner tube supported at opposite ends thereof by the inner partition wall structure and the upper cap. This second inner tube provided in addition to the inner tube having the inner space is filled with the second packing.

The second object indicated above may be attained according to a still further form of the invention wherein the draining means comprises: a hole formed through a bottom wall of the lower cap; drain bottle means having an enclosed space which communicates with the bottom space in the lower volume through the hole, for receiving a liquid consisting of the droplets; means for defining a restricted passage which communicates with the lower volume and the enclosed space in the drain bottle means, such that the restricted passage is open in the inner space in the inner tube disposed in the lower volume; and a draining device disposed in a bottom portion of the enclosed space in the drain bottle means, for discharging the liquid in the enclosed space out of the drain bottle means.

With the draining means constructed as described above, the droplets which are trapped and separated from the compressed air flowing through in the lower volume of the housing assembly can be efficiently fed into the drain bottle means, through the hole formed in the bottom wall of the lower cap, due to a flow of the air from the bottom space in the lower volume into the drain bottle means through the above-indicated hole, which occurs due to a flow of the air through the above-indicated restricted passage from the drain bottle means into the inner space within the inner tube disposed in the lower volume. That is, the droplets are carried by the air stream from the bottom space into the drain bottle means, under suction of the air into the inner space through the restricted passage. Accordingly, the droplets may be efficiently stored into the drain bottle means, without re-evporization within the lower volume of the filter body in which the droplets are trapped. Thus, the instant form of the invention assures further improved efficiency and stability of removal of the liquid particles from the compressed air.

The means for defining the restricted passage may comprise a capillary tube which extends from the enclosed space in the drain bottle means into the inner space in the inner tube, through the hole in the bottom wall of the lower cap. The draining device may comprise an automatic draining device for automatically discharging the liquid when an amount of the liquid stored in the enclosed space exceeds a predetermined value.

BRIEF DESCRIPTION OF THE DRAWINGS

The above and optional objects, features and advantages of the present invention will be better understood by reading the following detailed description of presently preferred embodiments of the invention, when considered in conjunction with the accompanying drawings, in which.

DETAILED DESCRIPTION OF THE PREFERRED EMBODIMENTS

Figure 1:
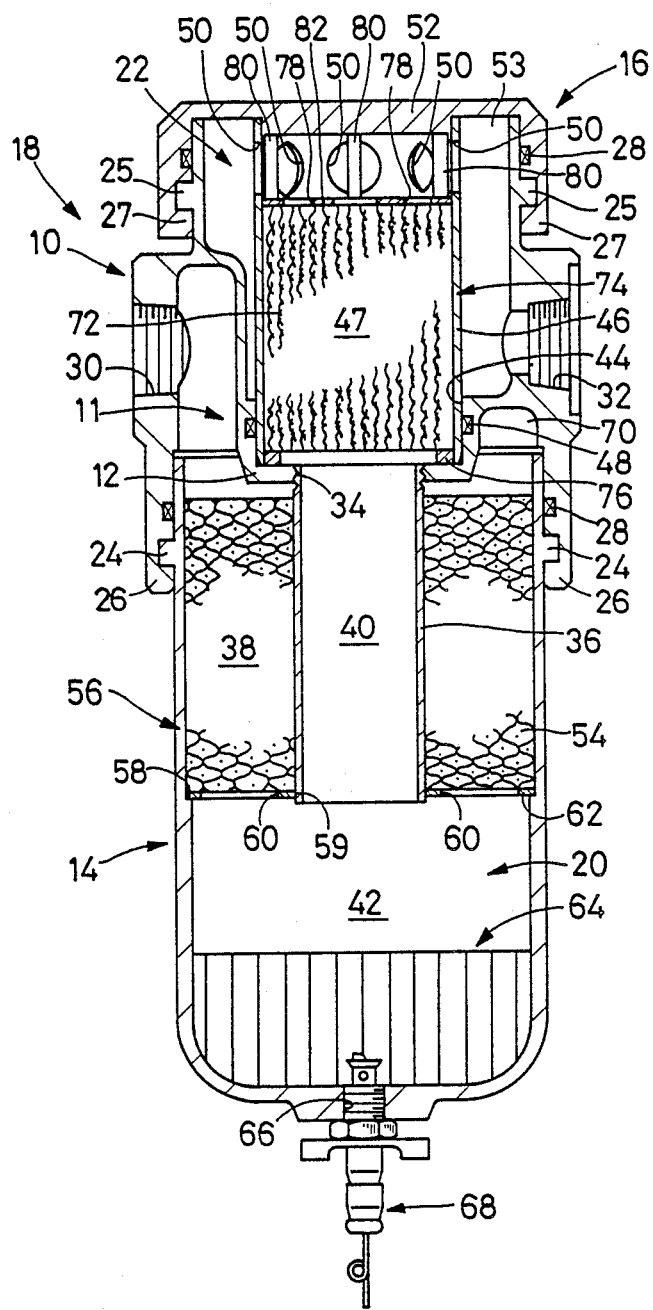
FIG. 1 is an elevational view in longitudinal cross section of one embodiment of an in-line filter device adapted for connection to a compressed air line.
Figure 2:
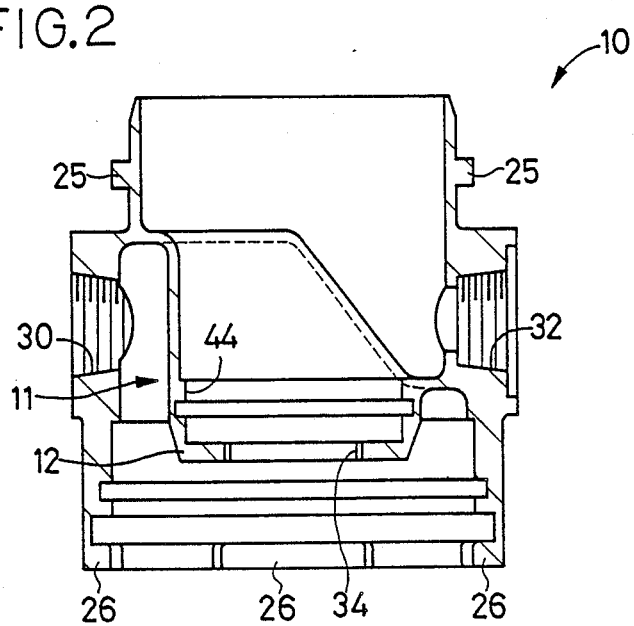
FIG. 2 is an elevational view in longitudinal cross section of an intermediate sleeve of the filter device of FIG. 1.
Figure 3:
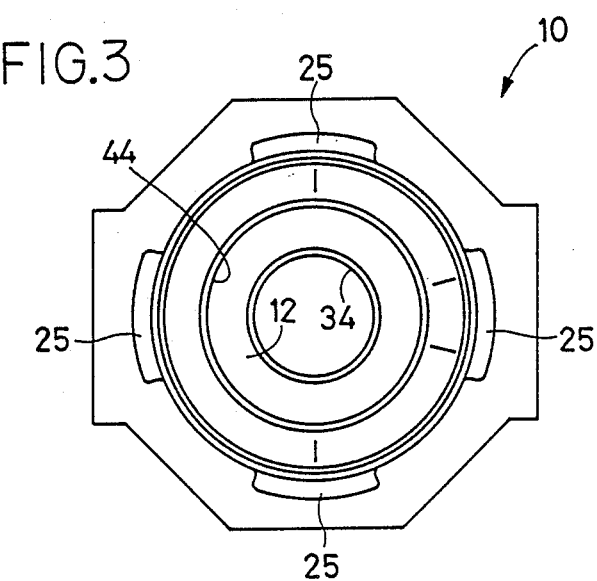
FIG. 3 is a top plan view of the intermediate sleeve of FIG. 2.
Figure 4:
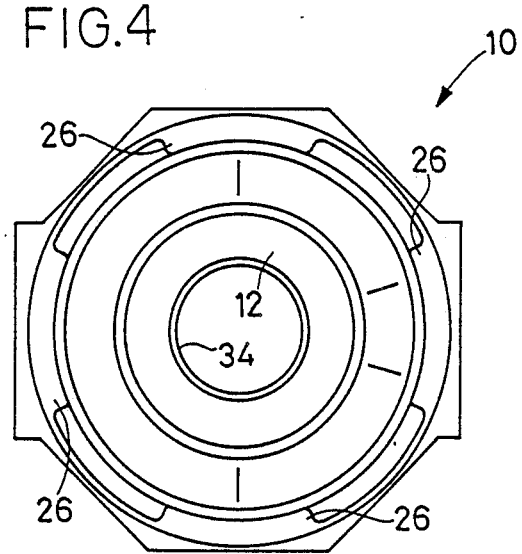
FIG. 4 is a bottom view of the intermediate sleeve.
Figure 5:
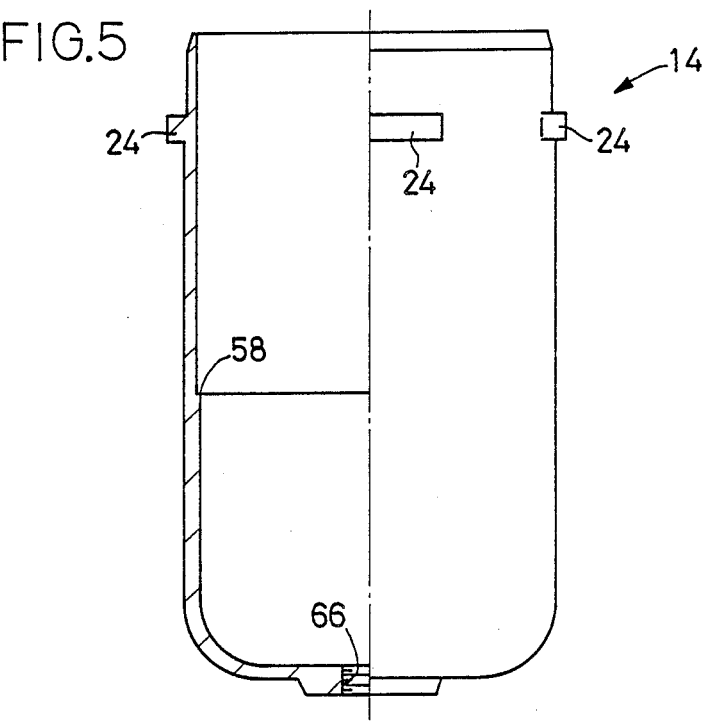
FIG. 5 is an elevational view partly in cross section of a lower housing of the filter device of FIG. 1.
Figure 6:
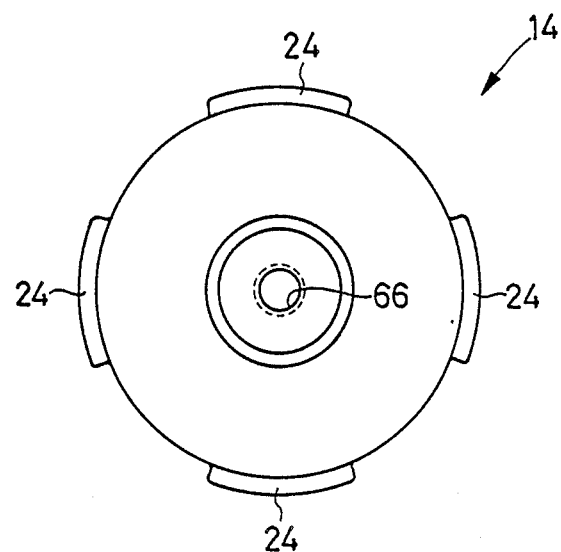
FIG. 6 is a bottom plan view of the lower housing of FIG. 5.
Figure 7:
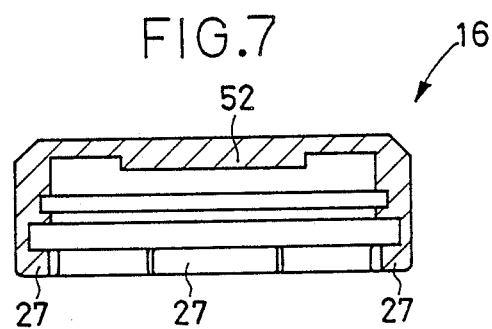
FIG. 7 is an elevational view in longitudinal cross section of an upper cap of the filter device of FIG. 1.
Figure 8:
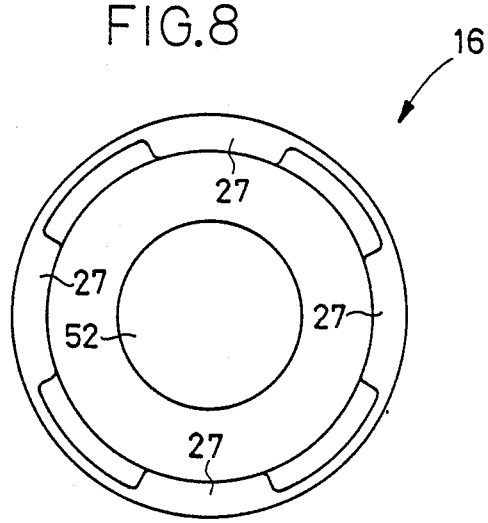
FIG. 8 is a bottom plan view of the upper cap of FIG. 7.

Referring first to FIG. 1 showing one form of the the filter device according to the present invention, reference numeral 10 designates a generally cylindrical intermediate sleeve which has an integrally formed inner partition wall structure 11 including a radial partition wall 12 as its lower end, as also shown in FIGS. 2-4. The partition wall 12 lies in a plane perpendicular to the longitudinal axis of the sleeve 10, at an axially middle position of the sleeve. This intermediate sleeve 10 is closed at its lower open end by a cylindrical lower cap 14 having a relatively large depth as also shown in FIGS. 5 and 6, and at its upper open end by a cylindrical upper cap 16 having a relatively small depth as also shown in FIGS. 7 and 8. With the opposite open ends of the intermediate sleeve 10 closed by the lower and upper caps 14, 16 attached thereto, there is formed a generally cylindrical housing assembly generally indicated at 18 in FIG. 1. The interior volume of the houssing asssembly 18 is divided into a lower volume 20 and an upper volume 22, by the inner partition wall structure 11 of the intermediate sleeve 10 which includes the radial partition wall 12.

In the present filter device, the lower cap 14 has a plurality of arcuate lugs 24 formed on its outer circumferential surface, near the upper open end, such that the arcuate lugs 24 are evenly spaced apart from each other in the circumferential direction of the lower cap 14, as indicated in FIGS. 5 and 6. On the other hand, the intermediate sleeve 10 has a plurality of arcuate jaws 26 formed at its lower open end so as to extend radially inwardly, such that the arcuate jaws 26 are evenly spaced apart from each other in the circumferential direction of the sleeve 10, as indicated in FIGS. 2 and 4. When the intermediate sleeve 10 and the lower cap 14 are assembled, the upper end portion of the lower cap 14 is first inserted in the corresponding lower end portion of the intermediate sleeve 10, with the arcuate lugs 24 passed between the adjacent arcuate jaws 26. Then, the sleeve 10 and the lower cap 14 are rotated relative to each other so that the arcuate lugs and jaws 24, 26 engage each other, in aligned relationship in the circumferential direction of the sleeve and cap 10, 14.

Similarly, the intermediate sleeve 10 is assembled with respect to the upper cap 16. Namely, the intermediate sleeve 10 has arcuate lugs 25 formed on its outer circumferential surface, at its upper open end, as also shown in FIGS. 2 and 3, while the upper cap 16 has a plurality of arcuate jaws 27 formed at its lower open end, as also shown in FIGS. 7 and 8. The upper cap 16 is first fitted in the upper end portion of the intermediate sleeve 10, and rotated relative to the sleeve 10 so as to establish aligned engagement between the arcuate lugs and jaws 25, 27.

The intermediate sleeve 10 is fluid-tightly sealed by O-rings 28 relative to the lower and upper caps 14, 16, at their engaging portions, so that the 0-rings 28 provide a pressure-tight seal of the lower and upper volumes 20, 22 with respect to the ambient atmosphere.

The intermediate sleeve 10 has an inlet port 30 and an outlet port 32 formed through diametrically opposed portions of its outer cylindrical wall, such that the inlet and outlet ports 30, 32 are coaxial with each other and communicate with the lower and upper volumes 20, 22, respectively. The partition wall 12 of the intermediate sleeve 10 has a threaded center hole 34 to which there is fixed an externally threaded upper axial end of a thin-walled cylindrical inner tube 36. This inner tube 36 extends through the lower volume 20, in coaxial relationship with the lower cap 14. The length of the inner tube 36 is determined so that the lower end of the tube 36 is positioned in the middle of the length of the lower cap 14.

In the structure arrangement described above, the lower volume 20 consists of an outer annular space 38 defined between the inner tube 36 and the lower cap 14, an inner cylindrical space 40 formed within the inner tube 36, and a bottom space 42 which is formed beneath the inner tube 36, in fluid communication with the outer annular space 38 and the inner cylindrical space 40. A compressed air entering the lower volume 20 through the inlet port 30 is first admitted into the outer annular space 38, directed into the bottom space 42, and then directed into the upper volume 22 through the inner cylindrical space 40.

The inner partition wall structure 11 of the intermediate sleeve 10 which includes the radial partition wall 12 has a cylindrical bore 44 formed in communication with the center hole 34, and in coaxial relationship with the inner cylindrical space 40. In this cylindrical bore 44, there is fixedly positioned a lower portion of a second inner tube 46 which has a larger diameter than the first inner tube 36 which has the space 40 extending therethrough. The second inner tube 46 has a plurality of communication holes 50 formed through an upper end portion thereof. The second inner tube 46 is retained at its axially opposite ends, by and between the partition wall 12 and the upper cap 16, such that the inner tube 46 is disposed in the upper volume 22, in coaxial relationship with the sleeve 10 and the upper cap 16. Between the cylindrical bore 44 and the lower end portion of the second inner tube 46, there is provided an O-ring 48 to provide a sealing between the inner partition wall structure 11 of the sleeve 10 and the second inner tube 46. The upper cap 16 has a circular protrusion 52 protruding from its inner surface, so as to engage the upper open end of the inner tube 46 and thereby hold the tube 46.

The compressed air flowing from the lower volume 20 upwardly through the space 40 is admitted into an inner cylindrical space 47 formed through the second inner tube 46. The air flowing upwardly through the space 47 flows out of the tube 46 through the communication holes 50, and enters an annular discharge space 53 formed between the sleeve 46 and the intermediate sleeve 10. The discharge space 53 communicates with the outlet port 32, so that the air is returned through the output port 32 into the compressed air line to which the instant filter device is connected.

Figure 9:
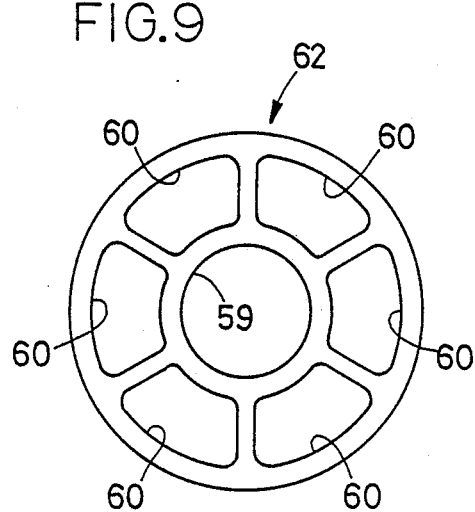
FIG. 9 is a plan view of a support member used in the filter device of FIG. 1.

In the housing assembly 18 having the air flow spaces formed therein as described above the outer annular space 38 of the lower volume 20 is filled with an outer pad or packing 54 made of wound wire mesh fibers such as stainless steel fibers. The lower cap 14, the first inner tube 36 and the first packing 54 constitute a first filter 56 of the instant filter device. The lower cap 14 has a shoulder 58 formed in its inner circumferential surface, at the lower end of the outer annular space 38. The first packing 54 is retained in position in the annular space 38, by a thin-walled circular support member 62 which has a circular center hole 59 and a circular array of apertures 60 that are located so as to surround the circumference of the center hole 59, as shown in FIG. 9. The support member 62 fixedly engages the outer surface of the first inner tube 36, at its center hole 59, and is held in abutting contact with the shoulder 58, at its outer periphery. The intermediate sleeve 10 has an annular intake space 70 located above the annular top face of the first packing 54, so that the compressed air which has entered the lower volume 20 through the inlet port 30 is evenly distributed over the entire top face of the first packing 54.

The bottom space 42 disposed below the outer annular space 38 accommodates a porous structure 64 of honeycomb construction such that the honeycomb passages are oriented so as to extend in the vertical direction. The lower cap 14 partially defining the bottom space 42 has a bottom wall which has a threaded hole 66 formed therethrough. To this hole 66, there is attached a drain valve 68. While a suitable known valve may be used as the drain valve 68, a drain valve as disclosed in laid-open Publication No. 62-99313 of unexamined Japanese Utility Model Application may be particularly preferably used.

Figure 10:
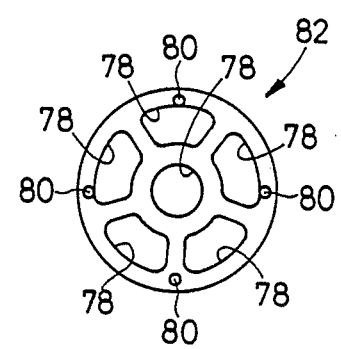
FIG. 10 is a plan view of a retainer member used in the filter device.

The housing assembly 18 further has a second pad or packing 72 made of wound fabric materials such as cotton fabric, which fills the inner cylindical space 47 defined by the second inner tube 46 disposed in the upper volume 22. The second inner tube 46 and the second packing 72 constitute a second filter 74 of the instant filter device. The lower end of the second packing 72 is spaced a suitable distance from the radial partition wall 12, by an annular spacer 76, so that the compressed air can be evenly distributed over the entire lower end face of the second packing 72. The second packing 72 is retained in position within the inner tube 46, by and between the annular spacer 76, and a retainer member 82 which is disposed within the inner tube 46, in abutting contact with the upper end face of the packing 72. As shown in FIG. 10, the retainer member 82 has a plurality of apertures 78, and a plurality of legs 80 whose free ends are held in abutment on the inner surface of the circular protrusion 52 of the upper cap 16, as indicated in FIG. 1.

The filter device constructed as described above is connected to the compressed air line such that the inlet port 30 communicates with a relatively upstream portion of the line while the outlet port 32 communicates with a relatively downstream portion of the line. In operation, the compressed air which has entered the lower volume 20 through the inlet port 30 is directed into the outer annular space 38. As a result, the compressed air expands in the annular space 38 and adiabatically cools as it expands. Consequently, the vapor contained in the compressed air is condensed. Further, as the air is passed through the first packing 54 of the first filter 56, water and/or oil vapor or liquid particles contained in the compressed air are coalesced into droplets. The droplets are carried by the compressed air, into the bottom space 42.

Since the cross sectional area of the bottom space 42 is larger than that of the outer annular space 38 (first filter 56), the velocity of the air which has entered the bottom space 42 is reduced, and the entrained droplets carried by the air flow are effectively separated from the air, and fall by gravity and centrifugal force toward the bottom of the bottom space 42, whereby the droplets are introduced into the porous honeycomb structure 64. Since the porous structure 64 does not permit substantial movements or flows of the air therethrough, revaporization of the droplets within the porous structure 64 is avoided. The droplets which have entered the porous structure 64 are coalesced with those existing in the porous structure 64, and the combined droplets are discharged out of the filter device through the drain valve 68.

The compressed air, which is thus dried to a substantial degree, is then directed through the inner cylindrical space 40 into the second packing 72 of the second filter 74 in the second inner tube 46. As the air passes through the second packing 72, water and/or oil remaining in the air as liquid particles are completely vaporized, due to turbulence of the air flow through the structure of the second packing 72. As a result, the compressed air free of water and/or oil particles is discharged back into the compressed air line, through the output port 32.

In the instant filter device constructed as described above, the first and second filters 56, 74 are disposed coaxially with each other within the housing assembly 18. Therefore, the filter assembly as a whole can be designed and constructed in a considerably compact form, whereby the required installation space for the filter device can be accordingly reduced, and the device may be located at a functionally suitable location, that is, near a pneumatically operated device to which the compressed air is supplied through the air line. Thus, the instant filter device can effectively function to protect the pneumatically operated device against entry of liquid particles with the compressed air.

The instant filter device has another excellent advantage. Namely, the interior volume is divided into the lower volume 20 including the first filter 56, and the upper volume 20 including the second filter 74, such that the first and second filters 56, 74 are spaced a suitable distance from each other in the longitudinal direction of the filter device. This arrangement facilitates the provision of sufficiently large cross sectional areas of the first and second filters 56, 74, without an interference between these two filters. Hence, the instant filter device is effective to minimize an undesirable pressure loss of the compressed air, while the structural arrangement is maintained sufficiently compact and small-sized.

A further advantage of the instant filter device resides in its easy maintenance, because the lower and upper caps 14, 16 may be removed from the intermediate sleeve 10 which has the inlet and outlet ports 30, 32 connected to the compressed air line. That is, the first filter 56 and/or the second filter 74, which are disposed within the housing assembly 18 (10, 14, 16), can be readily taken out from the housing assembly 18 by removing the lower and/or upper cap or caps 14, 16. Thus, the first and second filters 54, 56 can be easily replaced with new ones or cleaned, independently of each other.

In particular, it is noted that the lower and upper caps 14, 16 can be disassembled and re-assembled in an easy and quick fashion, with respect to the intermediate sleeve 10, by simply rotating the caps relative to the sleeve 10, while or after the appropriate end portions of the caps 14, 16 are fitted in or on the corresponding end portions of the sleeve 10, for engagement thereof over the suitable lengths. These disassembling and re-assembling operations may be made without any special tools.

Figure 11:
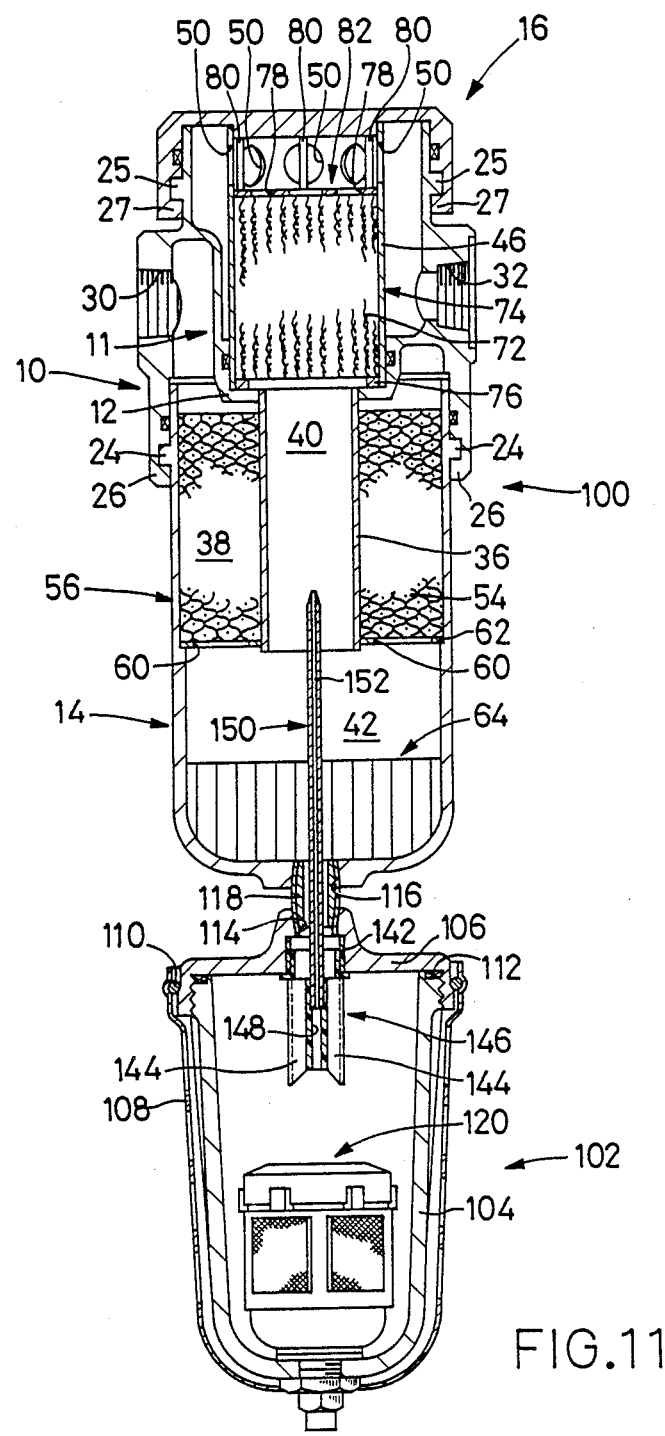
FIG. 11 is an elevational view in longitudinal cross section of another embodiment of the filter device of the present invention.
Figure 12:
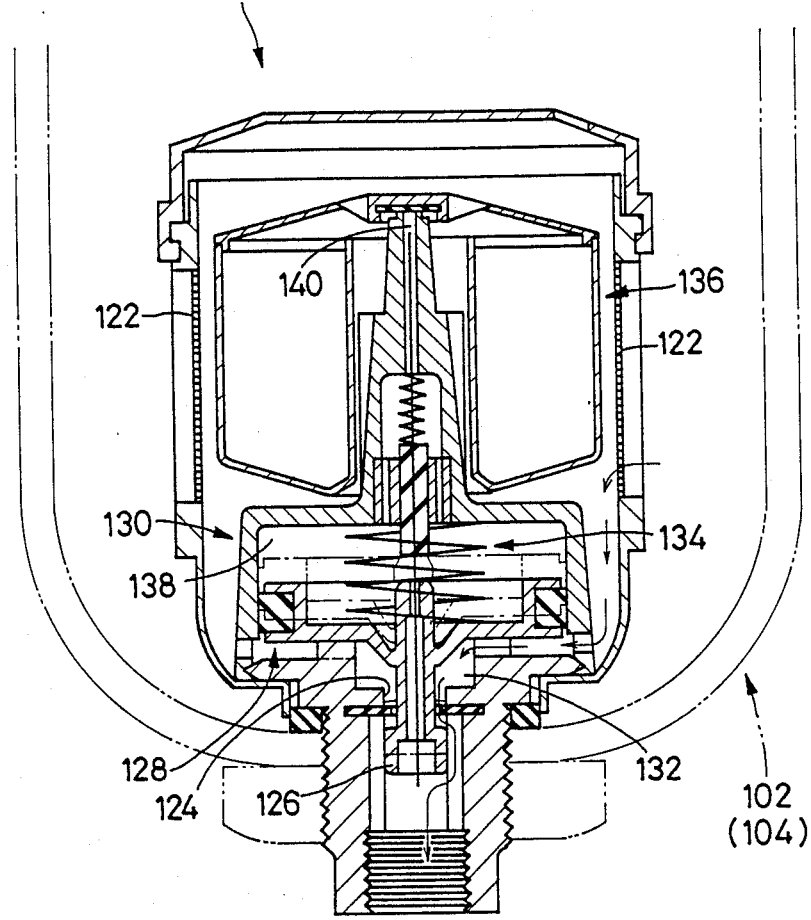
FIG. 12 is an enlarged elevational view in longitudinal cross section of an automatic draining device incorporated in a drain bottle attached to a filter body of the filter device of FIG. 11.
Figure 13:
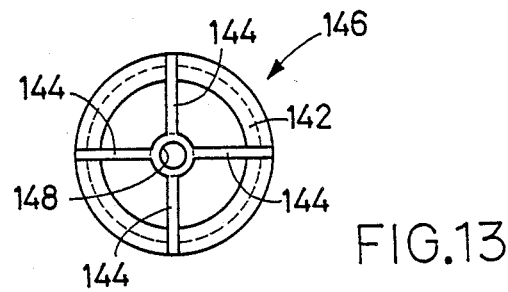
FIG. 13 is an enlarged bottom plan view of a retainer used for connecting the drain bottle to the filter body.

Referring next to FIGS. 11 through 13, there is illustrated a modified embodiment of the filter device of the invention, which consists of a filter body 100 similar to the filter device of the first embodiment, and a drain bottle 102 in the form of a closed container attached to the bottom of the lower cap 14 of the filter body 100. In the interest of brevity and simplification, the same reference numerals as used in FIGS. 1–10 will be used in FIGS. 11–13 to identify the functionally corresponding components, and no redundant description of the filter body 100 will be provided.

The drain bottle 102 includes a container 104 which is closed at its one end and open at the other end, and a lid 106 which is threaded to the open end of the container 104, so as to fluid-tightly close the open end. The container 104 is covered at its outer surface by a bottle cover 108 which has a plurality of windows. The bottle cover 108 has substantially the same shape as the container 104, and is fixed at its upper open end to the lid 106 via a retainer ring 110. Reference numeral 112 designates a packing to provide a fluid-tight sealing between the container 104 and the lid 106.

A coupling 118 in the form of a sleeve is used to connect a hole 114 formed through a central portion of the lid 106, and a hole 116 formed through the bottom wall of the lower cap 14 of the filter body 100. Thus, the drain bottle 102 is attached to the filter body 100, in fluid communication with each other.

Described more specifically, the bottom space 42 in the filter body 100 is held in communication with the interior of the drain bottle 102, through the hole 116 in the lower cap 14, coupling 118, and hole 114 in the lid 106, so that the droplets trapped in the bottom space 42 are received in the drain bottle 102.

Further, the drain bottle 102 incorporates an automatic draining device 120 disposed in its bottom portion. The automatic draining device 120 is operated so that the liquid (mass of the droplets) contained in the bottom portion of the drain bottle 102 is automatically discharged out of the filter device 100, 102, from time to time.

As shown in detail in FIG. 12, the automatic draining device 120 has a plurality of screens 122 of network structure, through which the air and the liquid from the filter body 100 are introduced into the interior of the drain device 120. In the lower portion of the device 120, there is disposed a piston 128 which is slidably received within a cylinder 130. The piston 128 is provided with an integrally formed valve 126 adapted to open and close a drain port 124. The piston 128 is moved between a lower position (indicated in solid line in FIG. 12) in which the drain port 124 is open allowing the liquid to be discharged therethrough, and an upper position (indicated in one-dot chain line in FIG. 12) in which the drain port 124 is closed.

The piston 128 is normally held in its upper position against a biasing force of a coil spring 134, with a pressure in the drain bottle 102 applied to a lower cylinder chamber 132. When a float 136 rises to a predetermined level with the surface level of the liquid which rises as the liquid from the filter body 100 is stored in the drain bottle 102, an upper cylinder chamber 138 of the cylinder 130 is brought into communication with the interior of the drain bottle 102 through an air passage 140. As a result, the piston 128 receives a pressure of the air in the upper cylinder chamber 138 as well as the biasing force of the coil spring 134, whereby the piston 128 is moved to its lower position.

With the piston 128 moved to the lower position, the drain port 124 is opened, and the liquid stored in the drain bottle 102 is discharged through the drain port 124, in a relatively short time under the pressure in the bottle 102. When the volume of the liquid stored in the drain bottle 102 is reduced, the surface level of the liquid and the float 136 are accordingly lowered, until the air passage 140 communicating with the interior of the drain bottle 102 is closed. Then, the piston 128 is raised to its upper position, and the drain port 124 is closed.

The construction and operation of the automatic draining device 120 are well known in the art, for example, as disclosed in laid-open Publication No. 45-36182 of examined Japanese Patent Application. No further description of the device 120 is deemed necessary.

The drain bottle 102 has a retainer 146 fixed to the underside of the lid 106. As also shown in FIG. 13, the retainer 146 consists of an externally threaded cylindrical portion 142 engaging the tapped hole 114 in the lid 106, and a vane portion having a plurality of vanes 144 (generally cross-cross structure having four vanes, in this specific embodiment) which extend downwardly from the cylindrical portion 142. Even with the retainer 146 attached to the lid 106, the fluid communication between the interiors of the filter body 100 and the drain bottle 102 through the hole 114 is possible through the spacings between the adjacent vanes 144.

The retainer 146 has a longitudinal passage 148 formed through a central part of the vane portion at which the vanes 144 intersect each other. A capillary tube 150 is attached to the retainer 146 such that a lower portion of the capillary tube 150 is fixedly received in the longitudinal passage 148 and extends through the cylindrical portion 142. When the retainer 146 is fixed to the lid 106 of the drain bottle 102, the capillary tube 150 extends through the hole 114 (coupling 118), and projects into the interior of the filter body 100, such that the free end of the tube 150 is open in the inner cylindrical space 40 in the first inner tube 36. In this arrangement, the interiors of the filter body 100 and the drain bottle 102 communicate with each other through a relatively restricted passage which consists of an orifice 152 formed through the capillary tube 150, and the longitudinal passage 148 formed through the retainer 146.

In the above arrangement, the capillary tube 150 extending from the interior of the drain bottle 102 into the interior of the filter body 100 is open at its free end in the cylindrical space 40, in the direction of flow of the compressed air through the space 40. Consequently, there arises a difference between the pressures adjacent to the opposite open ends of the tube 150. This pressure difference causes a continuous flow of the air from the drain bottle 102 into the filter body 100, through the restricted passage 148, 152.

As a result of a decrease in the pressure in the drain bottle 102, due to the air flow through the restricted passage 148, 152, there exists a permanent flow of the air from the lower portion of the bottom space 42 into the drain bottle 102, through the coupling 118 (holes 116, 114). With this air flow, the droplets which have been separated from the compressed air stream entering the cylindrical space 40 and fall into the porous structure 64 are introduced into the drain bottle 102 while being carried by the air stream sucked into the drain bottle 102.

Since the amount of the air flow within the drain bottle 102, in particular in the bottom portion of the drain bottle 102, is considerably smaller than that within the filter body 100, re-evaporation of the droplets introduced into the drain bottle 102 is substantially eliminated. Further, the lower ends of the vanes 144 of the retainer 146 fixed to the hole 114 are cut obliquely such that the axial distance of the inclined lower end face of each vane 144 from the open end of the passage 148 increases in the radially outward direction of the passage 148. This arrangement effectively prevents a back flow of the droplets into the passage 148 after the droplets are once introduced into the drain bottle 102 through the spacings between the adjacent vanes 144.

In the filter device equipped with the drain bottle 102 constructed as described above, the droplets trapped in the bottom space 42 of the filter body 100 are efficiently discharged from the filter body 100 into the drain bottle 102, while being carried by the air stream into the bottle, whereby the re-evaporation of the trapped droplets is minimized, and the efficiency of removal of the liquid particles from the compressed air is effectively improved and stabilized.

While the present invention has been described in its presently preferred embodiment with a certain degree of particularly, it is to be understood that the invention is not limited to the details of the illustrated embodiments, but may be embodied with various changes, modifications and improvements.

For instance, the structural arrangements for attaching the lower and upper caps 14, 16 to the intermediate sleeve 10 are not limited to those used in the illustrated embodiments, but may employ other means such as threaded structures or bolt-fastening structures.

Further, the first filter packing 54 is not limited to the wound mesh of stainless steel fibers used in the illustrated embodiments, but may be replaced by a packing made of various other materials such as other metal wire mesh fibers or fabrics, which are adapted to promote coalescence of vapor or liquid particles in the compressed air passing therethrough. Also, the second filter packing 72 which is wholly made of fabric material in the illustrated embodiments may be made of alternating spiral layers of wire mesh and absorbent fabric such as cotton fabric. For further details of the first and second packings 54, 72, reference is made to U.S. Pat. No. 4,116,650, the disclosure of which is hereby incorporated by reference.

In the illustrated embodiments, the second inner tube 46 is disposed within the upper volume 22 so that the compressed air flowing through the inner cylindrical space 40 in the lower volume 20 is admitted into the second packing 72 which fills the interior of the tube 46. However, the second inner tube 46 may be eliminated. In this case, the entire upper volume 22 may be filled by the second packing 74.

Although the illustrated embodiments use the porous structure 64 of honeycomb construction, it will be obvious that the porous structure 64 is replaced by other suitable porous structures that are capable of trapping droplets contained in the compressed air in the bottom space 42, and effectively preventing substantial movements of the air therethrough.

While the capillary tube 152 which cooperates with the passage 148 to form the restricted passage in the second embodiment is supported by the retainer 146 so as to extend through the hole 116 into the filter body 100, the position and construction of the tube 152 are not limited to those of the illustrated embodiments. Further, the retainer 146 need not be provided.

It is also possible to adjust the effect of suction of the air from the bottom space 42 of the filter body 100 into the drain bottle 102 through the hole 116, by suitably controlling the diameter of the first inner tube 36 in which the restricted passage (capillary tube 150) is open.

Further, the means for discharging the liquid from the drain bottle 102 is not limited to the illustrated automatic draining device 120, but may be replaced by various other known devices, such as a device using a drain valve as disclosed in laid-open Publication No. 62-99313.

In the illustrated second embodiment, the filter body 100 and the drain bottle 102 use separate housings. However, the filtering means and the draining means may be disposed in respective separate sections of a one-piece housing structure.

It is to be understood that the present invention may be embodied with various other changes, modifications and improvements, which may occur to those skilled in the art, without departing from the spirit and scope of the invention defined in the following claims.

What is claimed is:

1. An in-line filter device including first filter means having a first packing adapted to coalesce vapor or liquid particles contained in compressed air passing therethrough, into droplets, trapping means for trapping the droplets and thereby separating the droplets from the compressed air, and second filter means having a second packing through which the compressed air which has passed said first filter means flows, the second packing being adapted to vaporize residual liquid particles remaining in the compressed air which has passed the first filter means, said inline filter device comprising:

an intermediate sleeve having an upper and a lower open end and an inner partition wall structure;

an upper cap having an inlet and an outlet closing said upper open end of said intermediate sleeve and cooperating with the intermediate sleeve to define an upper volume on one of opposite sides of said partition wall structure, said inlet communicating with the first packing and said outlet communicating with the second packing;

a lower cap closing said lower open end of said intermediate sleeve and cooperating with the intermediate sleeve to define a lower volume on the other side of said partition wall structure, said intermediate sleeve and said upper and lower caps constituting a housing assembly having said upper and lower volumes separated from each other by said partition wall structure;

an inner tube disposed in said lower volume so as to extend from said partition wall structure, and cooperating with said lower cap to define an inner space and an outer annular space which communicate with each other through a bottom space formed below said inner tube, said lower volume communicating with said upper volume through said inner space;

said intermediate sleeve having an inlet port which communicates with said outer annular space and which receives an incoming compressed air, and an outlet port which communicates with said upper volume and through which the compressed air is discharged from said housing assembly;

said outer annular space being filled with said first packing, to form said first filter means;

a porous structure accommodated within said bottom space, as said trapping means for trapping said droplets formed during passage of the compressed air through said first filter means;

draining means for discharging a mass of the droplets trapped by said porous structure, out of said housing assembly;

said second packing filling at least a portion of said upper volume and thereby forming said second filter means through which the compressed air which has passed through said inner space flows.

2. An in-line filter device according to claim 1, wherein one of said intermediate sleeve and said lower cap has a plurality of radially outwardly extending first engagement portions formed near the open end thereof such that said first engagement portions are spaced apart from each other in a circumferential direction of said housing assembly, while the other of said intermediate sleeve and said lower cap has a plurality of radially inwardly extending second engagement portions formed near the open end thereof such that said second engagement portions are spaced apart from each other in said circumferential direction, the open end portion of said one of the intermediate sleeve and the lower cap being fitted in the open end portion of said other of the intermediate sleeve and the lower cap, said first and second engagement portions being held in engagement with each other as a result of a relative rotational movement of said intermediate sleeve and said lower cap.

3. An in-line filter device according to claim 1, wherein one of said intermediate sleeve and said upper cap has a plurality of radially outwardly extending first engagement portions formed near the open end thereof such that said first engagement portions are spaced apart from each other in a circumferential direction of said housing assembly, while the other of said intermediate sleeve and said upper cap has a plurality of radially inwardly extending second engagement portions formed near the open end thereof such that said second engagement portions are spaced apart from each other in said circumferential direction, the open end portion of said one of the intermediate sleeve and the upper cap being fitted in the open end portion of said other of the intermediate sleeve and the upper cap, said first and second engagement portions being held in engagement with each other as a result of a relative rotational movement of said intermediate sleeve and said upper cap.

4. An in-line filter device according to claim 1, wherein said lower cap has a larger depth than said upper cap.

5. An in-line filter device according to claim 1, further comprising another inner tube supported at opposite ends thereof by said inner partition wall structure and said upper cap, said another inner tube being filled with said second packing.

6. An in-line filter device according to claim 1, wherein said draining means comprises:

a hole formed through a bottom wall of said lower cap;

drain bottle means having an enclosed space which communicates with said bottom space in said lower volume through said hole, for receiving a liquid consisting of said droplets;

means for defining a restricted passage which communicates with said lower volume and said enclosed space in said drain bottle means, such that said restricted passage is open in said inner space in said inner tube disposed in said lower volume; and a draining device disposed in a bottom portion of said enclosed space in said drain bottle means, for discharging said liquid in said enclosed space out of said drain bottle means.

7. An in-line filter device according to claim 6, where said means for defining a restricted passage includes a capillary tube which extends from said enclosed space in said drain bottle means into said inner space in said inner tube, through said hole in said bottom wall of said lower cap.

8. An in-line filter device according to claim 6, wherein said draining device comprises an automatic draining device for automatically discharging said liquid when an amount of said liquid stored in said enclosed space exceeds a predetermined value.

* * * * *